United States Patent
Cooper et al.

(10) Patent No.: US 6,418,485 B1
(45) Date of Patent: Jul. 9, 2002

(54) SYSTEM AND METHOD FOR MANAGING DEVICE DRIVER LOGICAL STATE INFORMATION IN AN INFORMATION HANDLING SYSTEM

(75) Inventors: Michael Richard Cooper; Bryan Douglas Dobbs; Ravi Ravisankar; Mark Wayne VanderWiele, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/845,229

(22) Filed: Apr. 21, 1997

(51) Int. Cl.[7] ............................................... G06F 13/10
(52) U.S. Cl. ...................................................... 709/321
(58) Field of Search ................................ 395/681, 651, 395/830; 709/301, 321–327; 713/1; 710/10

(56) References Cited

U.S. PATENT DOCUMENTS

| | | | | |
|---|---|---|---|---|
| 4,649,479 A | * | 3/1987 | Advani et al. ............... | 364/300 |
| 5,319,751 A | * | 6/1994 | Garney ........................ | 395/200 |
| 5,339,432 A | * | 8/1994 | Crick .......................... | 395/700 |
| 5,353,411 A | * | 10/1994 | Nakaosa et al. ............ | 395/275 |
| 5,459,867 A | * | 10/1995 | Adams et al. .............. | 395/700 |
| 5,517,635 A | * | 5/1996 | Cross et al. ................ | 395/500 |
| 5,548,759 A | * | 8/1996 | Lipe ........................... | 395/600 |
| 5,613,123 A | * | 3/1997 | Tsang et al. ................ | 395/651 |
| 5,732,282 A | * | 3/1998 | Provino et al. ............. | 395/830 |

OTHER PUBLICATIONS

S. Mastriannni, Writing OS/2 2.1 Device Drivers in C, pp. 239–241, 1993.*

* cited by examiner

Primary Examiner—Majid Banankhah
Assistant Examiner—Sue Lao
(74) Attorney, Agent, or Firm—Leslie A. Van Leeuwen

(57) ABSTRACT

The present invention is directed to a system and method of managing logical device state information within an information handling system. Logical device state information is stored only once, by the information handling system. Device drivers do not need to maintain and store redundant copies of logical device state information. A device driver indicates whether or not it needs to have logical device state information passed to it. Before calling a device driver to handle a device function, the information handling system checks to determine whether or not the device driver has indicated that it needs logical device state information passed to it. If so, the information handling system passes the appropriate logical device state information to the device driver. For device functions which are not hooked by the device driver, the information handling system maintains the device state. System efficiency is increased, as each device driver may register for the subset of functions it can most efficiently handle, without hooking operating system functions or handling all state specific functions associated with a particular device function. In addition, device driver development may proceed in an incremental fashion, and device driver developers do not have to learn details of every operating system on which a device may be installed.

18 Claims, 4 Drawing Sheets

SYSTEM AND METHOD FOR MANAGING DEVICE DRIVER LOGICAL STATE INFORMATION IN AN INFORMATION HANDLING SYSTEM

BACKGROUND OF THE INVENTION

1. Field of the Invention

The present invention relates to the field of information handling systems and, more particularly, to a system and method for managing logical device state information for device drivers in an information handling system.

2. Description Of Related Art

An information handling system typically includes several input and/or output devices, such as a keyboard, video display, printer, modem, and mouse. These devices are usually managed by one or more device drivers. A device driver is a program that manages the flow of data to and from a device. In many operating systems, device drivers are the only programs which can handle interrupts from devices. A device driver that manages the flow of data between an information handling system and a printer or video display is referred to as a presentation device driver.

In a multi-windowed, multi-user information handling system, there are usually several processes executing in the system at any given time. These processes can each have their own characteristics. This means that operating system specific information needs to be kept for each process. When the process which is executing relates to a device, the operating system specific information which is kept is referred to as logical device state information. For example, the logical device state information for a printer may include font type, color, mix modes, transforms, and font size. Note that physical device state information, such as current physical color or current physical position, is information that is typically maintained by the device driver itself.

When a device manufacturer develops a new device, the device manufacturer also develops a device driver for each operating system under which the new device will operate. For example, if a printer manufacturer develops a new printer, the manufacturer will also develop corresponding device drivers to allow the printer to be attached to systems that run under several different operating systems. Device drivers are usually stored on diskettes or CD-ROMs, which are shipped with adapter cards sold along with the devices. Most operating systems include an "install device driver" option, which can be used to install a device driver. In the case of presentation devices, such as printers and displays, the adapter cards and printers typically include memory which can be used by the device driver, as well as circuitry, such as device processors, which can be used to control the devices.

One prior art approach to handling device driver development and managing logical device state information is through the use of application programming interfaces (APIs). An operating system defines APIs, through which application programs executing in the information handling system communicate with or use the devices attached to the system. The operating system also defines device driver interfaces (DDIs), which are used by the operating system to communicate with devices. When an application program invokes an API, the operating system typically performs some processing, and then executes one or more DDIs. There are several drawbacks to this prior art approach.

Whenever a new device is developed, a device driver must also be developed for each operating system supported. For each operating system supported, a device driver must implement functions to support every DDI defined by the operating system. In the case of a typical presentation device driver, there are many DDIs that must be implemented by the device driver. Because a separate device driver is developed for each supported operating system, the device driver developers must learn about each operating system, an often time-consuming process.

Another problem with this prior art approach is that logical device state information is typically maintained and stored by both the operating system and by the device driver. The operating system stores the logical device state information before calling a DDI. The operating system then passes control to the device driver, which also stores the information. If the device driver changes any logical device state information, the device driver makes the change in its copy of the logical device state information, and also must notify the operating system, through another DDI, that the logical device state information was changed. This results in redundant maintenance and storage of logical device state information. In addition, because the device driver maintains and stores logical device state information, device driver developers must be aware of operating system fundamentals, such as reentrancy and serialization. Furthermore, there may be times when the operating system, rather than the device driver, is better suited to handle particular functions, such as complex clipping functions.

Consequently, it would be desirable to have a system and method for managing logical device state information in an information handling system which would eliminate the redundancy found in prior art information handling systems. It would also be desirable to shorten the development time for new device drivers, while taking advantage of device processors which can be utilized by device drivers to efficiently manage devices.

SUMMARY OF THE INVENTION

Accordingly, the present invention is directed to a system and method of managing logical device state information in an information handling system. Logical device state information is stored only once, by the information handling system. Device drivers do not need to maintain and store redundant copies of logical device state information. A device driver indicates whether or not it needs to have logical device state information passed to it. Before calling a device driver to handle a device function, the information handling system checks to determine whether or not the device driver has indicated that it needs logical device state information passed to it. If so, the information handling system passes the appropriate logical device state information to the device driver. For device functions which are not hooked by the device driver, the information handling system maintains the device state.

The operating system creates at least one function table for each device detected in the information handling system, and registers default operating system programs in the function table to handle device functions. During initialization, control is passed to a device driver, at which time the device driver may register for any subset of the device functions in the appropriate function table. A device driver may register for a device function, without registering for the associated state change functions. Registration by the device driver overrides the default registration in the function table.

One of the embodiments of the invention is as sets of instructions resident in an information handling system.

An advantage of the present invention is that redundant copies of logical device state information are not maintained and stored by the information handling system. Another advantage of the present invention is that system efficiency is increased, as each device driver may register for the subset of functions it can most efficiently handle, without hooking operating system functions or handling all state specific functions associated with a particular device function. A further advantage of the present invention is that device driver development may proceed in an incremental fashion, and device driver developers do not have to learn details of every operating system on which a device may be installed.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
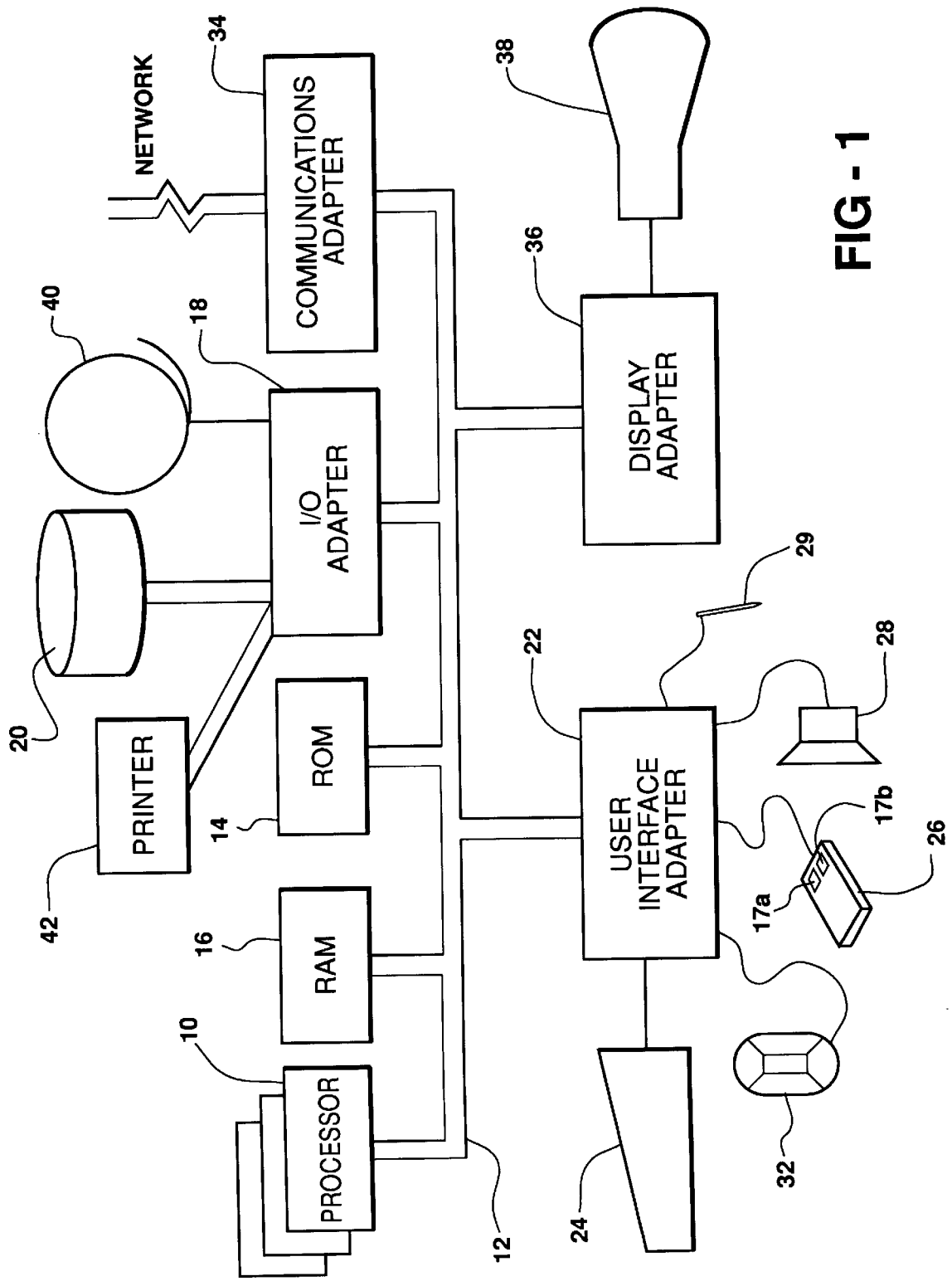
FIG. 1 is a block diagram of an information handling system capable of executing the logical device state management system of the present invention.

The invention may be implemented on a variety of hardware platforms, including personal computers, workstations, minicomputers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

One approach which has been developed to eliminate the problem of requiring device drivers to support many DDIs for each operating system is to require each device driver to support only a minimal number of DDIs. For example, using this approach, a printer device driver only has to support two primitive rendering functions—drawing a line and performing a bit map transfer. The operating system implements all other necessary DDIs. This approach allows for faster device driver development. Device drivers must support significantly fewer DDIs per operating system, and device driver developers do not need to learn each operating system in depth. However, this approach has several disadvantages.

Implementing functions through the operating system often results in slower, less efficient functions. This is because the operating system implements the functions in software, whereas the device driver may use device processors available on newer adapter cards or printers to perform the same functions much faster. A particular device driver may be designed to implement more than the required minimum number of DDIs. However, any DDIs other than the required minimum, will result in redundant maintenance and storage of logical device state information (similar to the problem discussed above in the background of the invention section herein).

The system and method of the present invention allow device drivers to handle any subset of the device DDIs. A device driver may handle only the required minimum number of DDIs, every DDI, or some number in between. Logical device state information is maintained and stored by the operating system. Through the use of a registration process, each device driver indicates to the operating system whether or not it needs to be passed the logical device state information.

Figure 2:
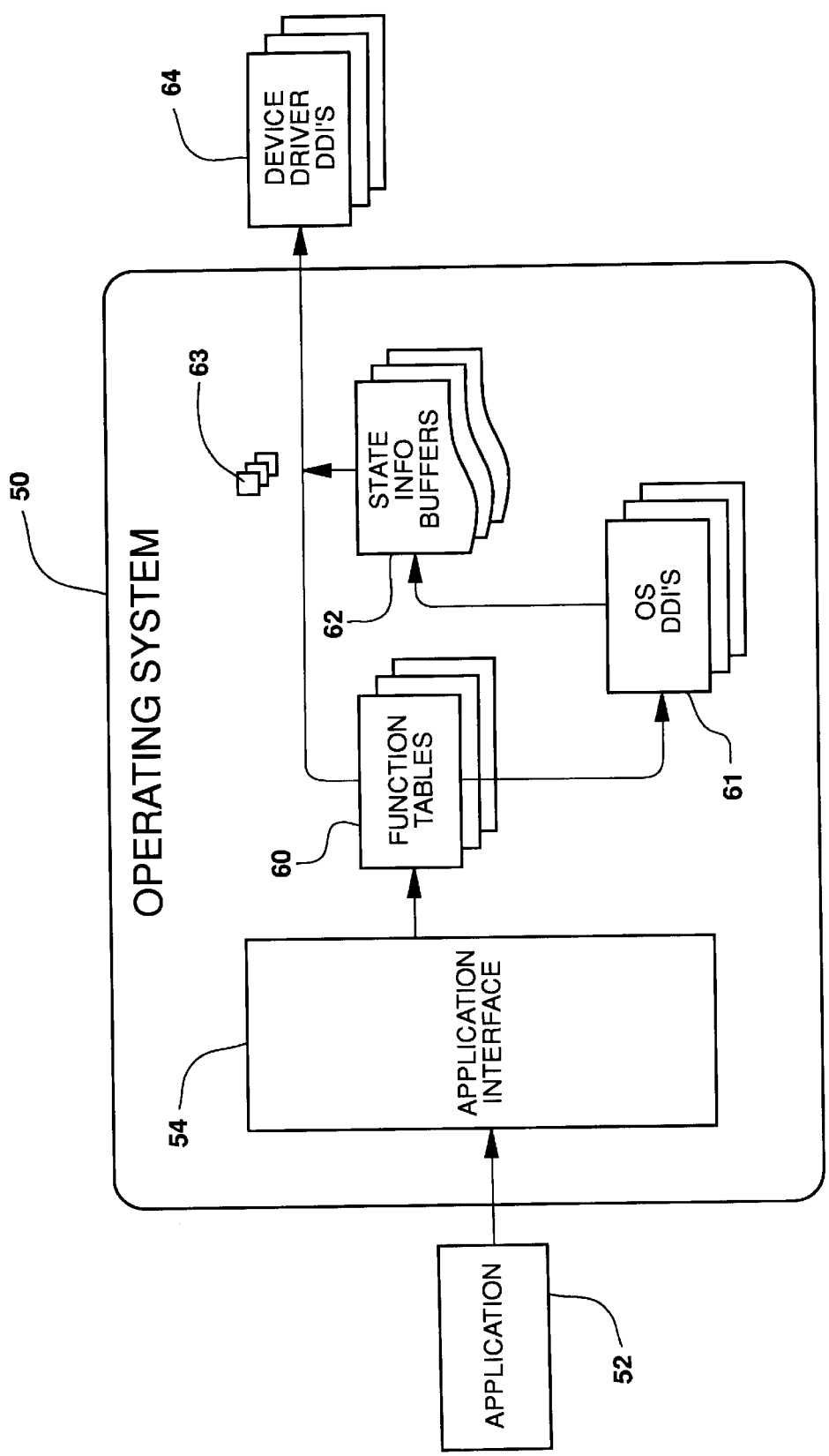
FIG. 2 is a block diagram illustrating the logical device state management system of the present invention.

Referring now to FIG. 2, a block diagram showing several components of the logical device state management system of the present invention will be described. The information handling system depicted in FIG. 1 will have one or more images of an operating system 50 for controlling operation of the processors 10. Application programs 52 will execute in the system, and will often make calls to operating system 50, through the use of application interface 54, to request operating system 50 to perform certain tasks.

For each device in the system, operating system 50 contains a function table 60. For each device function (i.e. each device DDI), the function table indicates whether an operating system DDI 61, or a device driver DDI 64, will be passed control to handle the function. Operating system 50 also includes a logical state information buffer 62 for each device. Logical state information buffer 62 stores the logical device state information for each device, and also stores registration information, regarding whether and when the logical device state information should be passed to a device driver DDI 64. In the described embodiment, registration information is logical device state flag 63, which may be set to one or zero. By setting logical device state flag 63 to one, a device driver indicates that logical device state information should be passed to it whenever a device driver DDI is given control. Note that logical device state flag 63 is shown for illustrative purposes only. There may be more than one logical device state flag 63 for each device, such that a device driver may register separately for each DDI, or for sets of DDIs. Alternately, a different type of registration means could be used altogether.

Also, note that the present invention may be implemented as part of an I/O subsystem or other subsystem, rather than as part of an operating system. However, for illustrative purposes, the invention will be described as part of an operating system.

Figure 3:
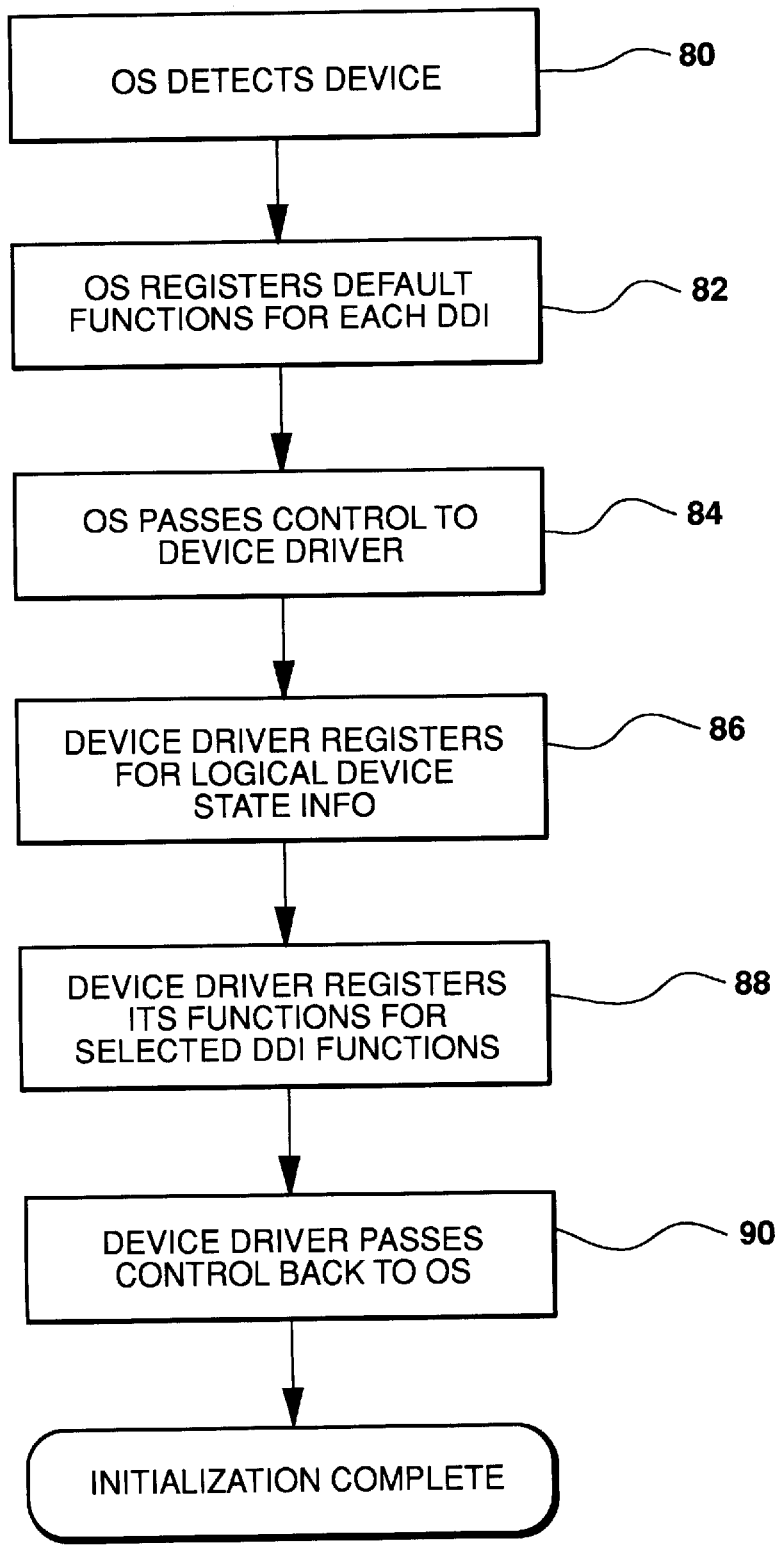
FIG. 3 is a flow chart depicting initialization of an information handling system according to the present invention.

Referring now to FIG. 3, a method of initializing the information handling system in accordance with the present invention will be described. Note that FIG. 3 does not contain every step that occurs during system initialization, but rather depicts the steps of interest to the present invention.

During system initialization, the operating system will detect any devices attached to the information handling system (step 80). When the operating system detects a device, it creates a default device table for the device, and registers operating system functions to handle all device functions (step 82). The operating system then passes control to the device driver associated with the device (step 84). At this point, the device driver typically initializes the device (i.e. checks the device, clears it to a default state, etc.).

The device driver indicates to the operating system that the device driver needs to have logical device state information passed to it whenever it is given control to handle a device function (step 86). This indication can be accomplished through the use of a registration process. This indication can also be done through the use of a flag, which a device driver could set to indicate that logical device state information needs to be passed. Note that the device driver may register on a global basis (i.e. the device driver will be passed logical device state information whenever it is called to handle any function), or the device driver may register on a per function basis (i.e. the device driver will only be passed logical device state information for selected functions).

The device driver then registers to handle a subset of the device functions (step 88). The device driver may choose to handle a few basic functions, and let the operating system continue to handle the majority of the device functions. Alternately, the device driver may choose to handle every possible device function. Preferably, the device driver will register to handle the functions that the device driver can handle more efficiently (for example, functions where the device driver may take advantage of device processors). After the device driver registers for the functions it will handle, the device driver passes control back to the operating system (step 90). Steps 80 through 90 are repeated for every device detected in the information handling system.

Figure 4:
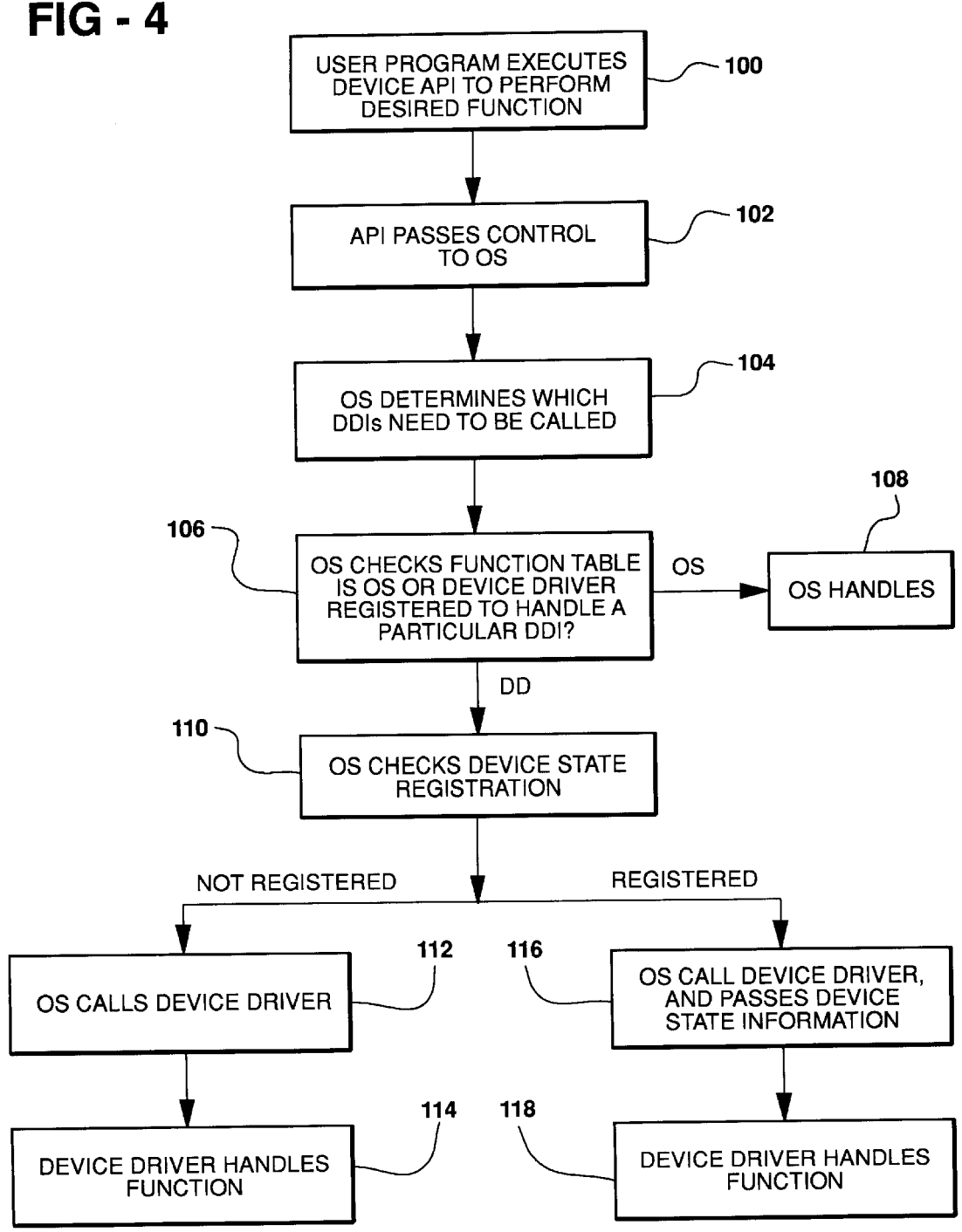
FIG. 4 is a flow chart depicting the method of performing a device function according to the present invention.

Referring now to FIG. 4, a method for performing a device function according to the present invention will now be described. Suppose an application program wishes to perform a particular device function. The function may be a simple state change type of function (e.g. changing the font for a document), or may be a complex graphics rendering operation. The application program executes an appropriate API to request that the function be performed (step 100). Calling the API causes the operating system to gain control (step 102). The operating system determines which DDI or DDIs need to be called in order to accomplish the desired function (step 104). Note that certain functions may only require the use of one DDI, whereas other functions will require that two or more DDIs be called.

For each DDI that must be called, the operating system checks the device function table to determine if the device driver will handle the DDI function or if the operating system will handle the DDI function (step 106). Note that the operating system can determine this by checking the address that is present in the function table. If the address is within the operating system's memory space, the operating system is handling the function. On the other hand, if the address is not within the operating system's memory space, then the device driver is handling the function.

If the operating system is handling the function, the operating system proceeds to call an operating system program to perform the function (step 108). However, if the device driver is handling the function, the operating system next checks the logical device state registration (step 110). If the device driver has not registered to receive logical device state information, this means that the device driver maintains and stores a copy of the logical device state information, and thus, the information does not have to be passed to the device driver. The operating system calls the device driver (step 112), passing it any normally passed parameters, and the device driver then handles the DDI function (step 114). If the device driver has registered to receive logical device state information (either on a global basis or for this particular DDI function), this means that the device driver does not maintain and store a copy of the logical device state information. Therefore, the operating system passes the logical device state information to the DDI (step 116), and the device driver then proceeds to handle the function (step 118).

The use of a registration process allows the system to be compatible with both device drivers implemented according to the present invention, and with prior art device drivers. A prior art device driver would not register to receive logical device state information, and so would continue to be called just as it was called in prior art systems (i.e. steps 112 and 114 would be taken). A device driver implemented according to the present invention would register to receive the logical device state information, and so would be passed the logical device state information when called (i.e. steps 116 and 118 would be taken).

The system and method of the present invention provide several advantages. Device drivers can be incrementally developed and tested. A device driver may register for a particular functional DDI (e.g. a graphics primitive DDI), without having to register for the dozens of associated state change DDIs that may be associated with the functional DDI. For example, suppose an application program wanted to both change a font type and print a line of text. The most efficient way to handle this would be to let the operating system handle the state change (i.e. the font change), and let the device driver handle the text output. Thus, the device driver would not register to handle the font change DDI, rather the operating system default DDI would handle it (i.e. step 108 would be taken in FIG. 4). However, the device driver would register to handle the text output DDI function. The device driver would also register to receive logical device state information. Therefore, steps 116 and 118 would be followed in FIG. 4.

Allowing device drivers to register for a subset of the device functions also increases the speed of the system. Device drivers can register to handle functions which are performed more efficiently using hardware circuitry, such as device processors, while the operating system can be left to handle functions which are more efficiently handled through the operating system, such as complex clipping, attribute changes, or transforms.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. An information handling system, comprising:
   one or more processors;
   one or more images of an operating system for controlling the operation of the processors;
   one or more devices;
   one or more device drivers, wherein each device driver controls input and output to a corresponding device;
   at least one system bus;
   means for storing logical device state information for each device;
   first registering means, wherein a selected device driver registers to handle one or more device functions for an associated device; and
   second registering means, wherein upon determining that the selected device driver needs to receive the logical device state information for the associated device, the selected device driver registers to receive the logical device state information for the associated device whenever the selected device driver is called to handle one of the device functions for the associated device.

2. An information handling system according to claim 1, further comprising means for passing logical device state information from the information handling system to a called device driver if the called device driver has registered to receive the logical device state information.

3. An information handling system according to claim 1, wherein said means for storing logical device state information comprises means for storing logical device state information in a memory means accessible to said operating system.

4. An information handling system according to claim 1, wherein said second registering means comprises means for the selected device driver to set a logical device state flag.

5. An information handling system according to claim 4, further comprising means for passing logical device state information from the information handling system to a called device driver if the called device driver has set an associated logical device state flag.

6. An information handling system according to claim 1, wherein said second registering means further comprises means for the selected device driver to register to receive logical device state information for a set of functions, wherein said set of functions comprises one or more device functions implemented by the selected device driver.

7. A method of managing logical device state information in an information handling system, comprising the steps of:
   storing logical device state information for one or more devices attached to the information handling system;
   registering a first device driver to handle one or more device functions for an associated device;
   determining if the first device driver needs to receive the logical device state information for the associated device in order to handle the device functions for which it is registered; and
   upon determining that the first device driver does need to receive the logical device state information, registering the first device driver to receive the logical device state information for the associated device.

8. A method according to claim 7, further comprising the step of passing logical device state information from the information handling system to a called device driver if the called device driver has registered to receive the logical device state information.

9. A method according to claim 7, wherein said storing step comprises the step of storing logical device state information in a memory means accessible to an operating system.

10. A method according to claim 7, wherein said step of registering the first device driver to receive the logical device state information for the associated device comprises the step of setting a logical device state flag.

11. A method according to claim 10, further comprising the step of passing logical device state information from the information handling system to a called device driver if the called device driver has set an associated logical device state flag.

12. A method according to claim 7, wherein said step of registering the first device driver to receive the logical device state information for the associated device further comprises the step of registering to receive logical device state information for a set of functions, wherein said set of functions comprises one or more device functions implemented by the device driver.

13. A computer-readable medium for managing logical device state information in an information handling system, comprising:
   means for storing logical device state information for one or more devices attached to the information handling system;
   first registering means, wherein a device driver registers to handle one or more device functions for an associated device; and
   second registering means, wherein upon determining that the device driver needs to receive the logical device state information for the associated device, the device driver registers to receive the logical device state information for the associated device whenever the device driver is called to handle one of the device functions for the associated device.

14. A computer-readable medium according to claim 13, further comprising means for passing logical device state information from the information handling system to a called device driver if the called device driver has registered to receive the logical device state information.

15. A computer-readable medium according to claim 13, wherein said means for storing logical device state information comprises means for storing logical device state information in a memory means accessible to an operating system.

16. A computer-readable medium according to claim 13, wherein said second registering means comprises means for the device driver to set a logical device state flag.

17. A computer-readable medium according to claim 16, further comprising means for passing logical device state information from the information handling system to a called device driver if the called device driver has set an associated logical device state flag.

18. A computer-readable medium according to claim 13, wherein said second registering means further comprises means for the device driver to register to receive logical device state information for a set of functions, wherein said set of functions comprises one or more device functions implemented by the device driver.

* * * * *